US012770433B2

(12) United States Patent
Chiu

(10) Patent No.: US 12,770,433 B2
(45) Date of Patent: Oct. 20, 2026

(54) METHOD AND DEVICE FOR DETECTING CHANGES IN EYE STATUS

(71) Applicant: Wistron Corp., New Taipei City (TW)

(72) Inventor: Chih Hao Chiu, New Taipei City (TW)

(73) Assignee: WISTRON CORP., New Taipei City (TW)

( * ) Notice: Subject to any disclaimer, the term of this patent is extended or adjusted under 35 U.S.C. 154(b) by 218 days.

(21) Appl. No.: 18/745,237

(22) Filed: Jun. 17, 2024

(65) Prior Publication Data

US 2025/0285468 A1 Sep. 11, 2025

(30) Foreign Application Priority Data

Mar. 11, 2024 (TW) ................................ 113108757

(51) Int. Cl.
*G06V 20/59* (2022.01)
*G06V 40/18* (2022.01)

(52) U.S. Cl.
CPC ............ *G06V 40/18* (2022.01); *G06V 20/597* (2022.01)

(58) Field of Classification Search
None
See application file for complete search history.

(56) References Cited

U.S. PATENT DOCUMENTS 10,129,450 B2 * 11/2018 Nabhan .................. H04N 23/57
2014/0334694 A1 * 11/2014 Perez ................... G06V 40/165 382/117
2015/0077543 A1 * 3/2015 Kerr ....................... A61B 3/113 348/135
2015/0207985 A1 * 7/2015 Uemura ................. G03B 17/04 348/333.01
2016/0114806 A1 * 4/2016 Ao ........................ B60W 40/08 348/148
2018/0092534 A1 * 4/2018 Nabhan .................. G16H 30/20
2019/0065873 A1 * 2/2019 Wang ................... G06V 40/168
2023/0360259 A1 * 11/2023 Barton ................ G02C 13/005

FOREIGN PATENT DOCUMENTS

CN 104688251 A 6/2015
CN 109389806 A 2/2019

OTHER PUBLICATIONS

Chinese language office action dated Aug. 29, 2024, issued in application No. TW 113108757.

* cited by examiner

*Primary Examiner* — Tsung Yin Tsai
(74) *Attorney, Agent, or Firm* — McClure, Qualey & Rodack, LLP

(57) ABSTRACT

A method for detecting changes in eye status is provided. The method includes receiving multiple consecutive facial images generated by a photography device photographing a person's face, wherein each facial image includes an eye region. The method includes obtaining a partial image including the eye region from each of the facial images. The method includes obtaining an eye contour area based on the partial image. The method includes obtaining standard deviations of eye contour heights based on the eye contour area. The method includes determining a change in the eye status of eyes within a time interval based on the standard deviations of all eye contour heights within the time interval, wherein the eye status includes an eye-open status and an eye-closed status.

18 Claims, 10 Drawing Sheets

METHOD AND DEVICE FOR DETECTING CHANGES IN EYE STATUS

CROSS REFERENCE TO RELATED APPLICATIONS

This application claims priority of Taiwan Patent Application No. 113108757, filed on Mar. 11, 2024, the entirety of which is incorporated by reference herein.

BACKGROUND OF THE APPLICATION

Field of the Application

The present disclosure generally relates to the field of image processing technologies. More specifically, aspects of the present disclosure relate to a method and device for detecting changes in eye status.

Description of the Related Art

To improve traffic safety, various drowsiness warning devices have been developed that can determine whether a driver is drowsy by detecting the status of the driver's eyes. When the driver is determined to be drowsy, an alarm can be set off to wake the driver up. The current conventional technology detects whether the height, aspect ratio, and eye contour area of the Region of Interest (ROI) of the eyes in a driver's face exceed specific thresholds to determine whether the driver is in a fatigued state.

However, the specific thresholds easily affect accuracy due to distance changes, height changes of the detected target, and the unique characteristics of different faces.

Therefore, there is a need for a method and device for detecting changes in eye status to achieve the purpose of accurately and quickly detecting changes in eye status.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, a method and device for detecting changes in eye status provided in the present disclosure detect standard deviations of eye contour heights to achieve the purpose of accurately detecting changes in eye status.

In an exemplary embodiment, a method for detecting changes in eye status is provided. The method includes receiving multiple consecutive facial images generated by a photography device photographing a person's face, wherein each facial image includes an eye region. The method includes obtaining a partial image including the eye region from each of the facial images. The method includes obtaining an eye contour area based on the partial image. The method includes obtaining standard deviations of eye contour heights based on the eye contour area. The method includes determining a change in the eye status of eyes within a time interval based on the standard deviations of all eye contour heights within the time interval, wherein the eye status includes an eye-open status and an eye-closed status.

In some embodiments, the step of obtaining an eye contour area based on the partial image further comprises: performing a grayscale conversion on the partial image to obtain a grayscale image; performing a binarization process on the grayscale image to obtain a binary image; and performing a dilation process and an erosion process on the binary image to obtain the eye contour area.

In some embodiments, the step of obtaining standard deviations of eye contour heights based on the eye contour area further comprises: obtaining an array of eye contour height differences according to the eye contour area; retrieving a portion of eye contour height difference data from the array of eye contour height difference; and calculating the standard deviations of the eye contour heights based on the portion of eye contour height difference data.

In some embodiments, the portion of the eye contour height difference data is composed of the first N % of the array of eye contour height differences and the last N % of the array of eye contour height differences.

In some embodiments, the step of determining a change in the eye status of eyes within the time interval based on the standard deviations of all eye contour heights within the time interval further comprises: using a smoothing window to sequentially perform a smoothing process on the standard deviations of eye contour heights corresponding to the multiple consecutive facial images to obtain average values of the standard deviations of eye contour heights; and determining the eye status of eyes based on the average values of the standard deviations of eye contour heights within the time interval.

In some embodiments, the method comprises determining that the change in the eye status of eyes within the time interval is from the eye-closed status to the eye-open status when the average values of the standard deviations of eye contour heights in the time interval continues to increase and a current average value of a standard deviation of a current eye contour height at a current time point is greater than an eye-open threshold; and determining that the change in the eye status of eyes within the time interval is from the eye-open status to the eye-closed status when the average values of the standard deviations of eye contour heights in the time interval continues to decrease and the current average value of the standard deviation of the current eye contour height at the current time point is less than an eye-closed threshold.

In some embodiments, the eye-open threshold and the eye-closed threshold are obtained according to the following steps: obtaining an array of the average values of the standard deviations of eye contour heights according to a preset time interval; retrieving a portion of average values of the standard deviations of eye contour heights data from the array of the average values of the standard deviations of eye contour heights; averaging the portion of the average values of the standard deviations of eye contour heights data to obtain a dynamic average; and setting the dynamic average multiplied by a first coefficient as the eye-open threshold, and setting the dynamic average multiplied by a second coefficient as the eye-closed threshold.

In some embodiments, a sum of the first coefficient and the second coefficient is 1 and the first coefficient is greater than the second coefficient.

In some embodiments, the standard deviations of the eye contour heights comprise a standard deviation of a right eye contour height or/and a standard deviation of a left eye contour height.

In some embodiments, when the eyes are in the eye-closed status for more than a preset time interval, a warning message is sent to notify the person.

In an exemplary embodiment, a device for detecting changes in eye status is provided. The device comprises one or more processors and one or more computer storage media for storing one or more computer-readable instructions. The processor is configured to drive the computer storage media to execute the following tasks. The following tasks comprise receiving multiple consecutive facial images generated by a photography device photographing a person's face, wherein each facial image includes an eye region. The following tasks comprise obtaining a partial image including the eye region from each of the facial images. The following tasks comprise obtaining an eye contour area based on the partial image. The following tasks comprise obtaining standard deviations of eye contour heights based on the eye contour area. The following tasks comprise determining a change in the eye status of eyes within a time interval based on the standard deviations of all eye contour heights within the time interval, wherein the eye status includes an eye-open status and an eye-closed status.

BRIEF DESCRIPTION OF DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Figure 1:
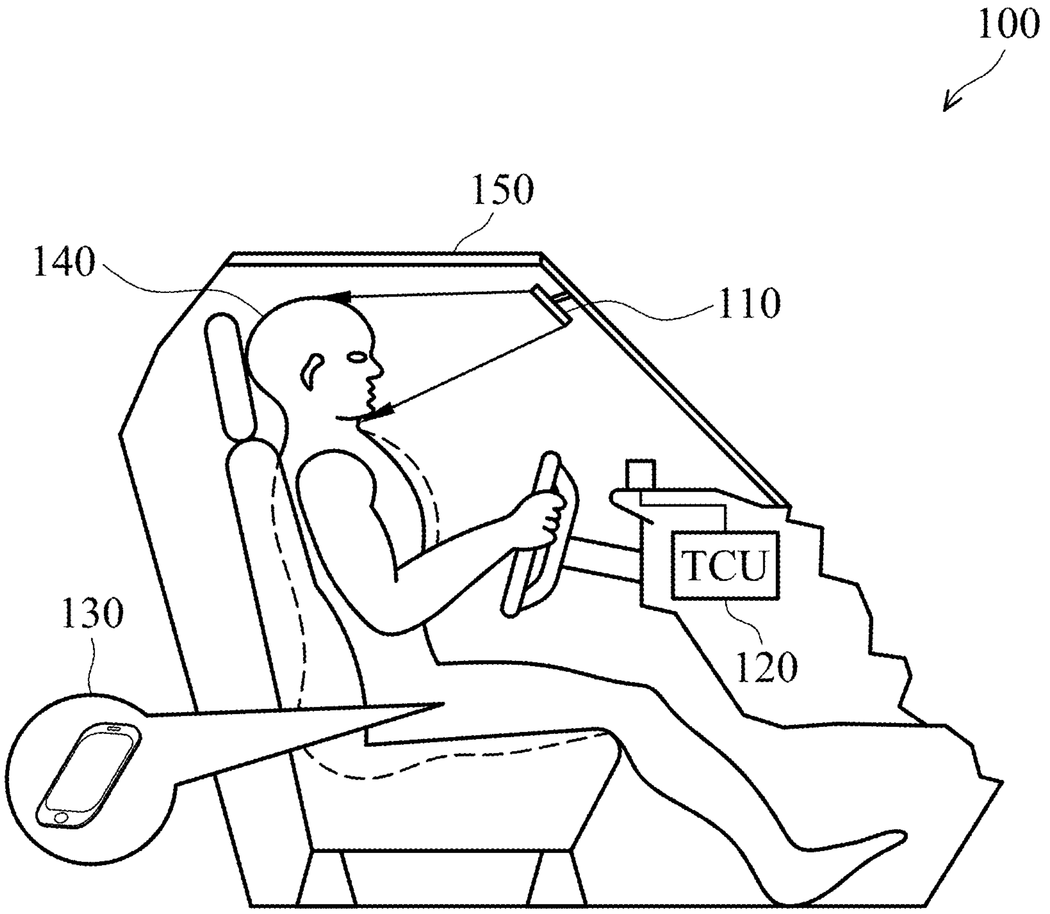
FIG. 1 is a schematic diagram showing a system for detecting changes in eye status according to an embodiment of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The embodiments of the present disclosure provide a method and device for detecting changes in eye status detect standard deviations of eye contour heights to achieve the purpose of accurately detecting changes in eye status.

In order to better describe the embodiments of the present disclosure, special terms used in the present disclosure are first defined below.

Eye-open status: in the current image, the eyes remain open. In other words, the whites and eyeballs of the eyes can be clearly observed.

Eye-closed status: in the current image, the eyes remain closed. In other words, the eyeball cannot be observed.

Eye-open action: this action is defined as the process of converting the eyes from an eye-closed status to an eye-open status. This action is a consecutive action.

Eye-closed action: this action is defined as the process of converting the eyes from the eye-open status to the eye-closed status. This action is a consecutive action.

FIG. 1 is a schematic diagram showing a system 100 for detecting changes in eye status according to an embodiment of the present disclosure. As shown in FIG. 1, the system 100 includes a photography device 110 installed in a vehicle 150, a telematics control unit (TCU) 120 and a mobile device 130. The photography device 110 is used to photograph a person's face 140, wherein the distance between the photographing device 110 and the person's face 140 is, for example, about 50 to 150 centimeters.

The photography device 110 can generate multiple consecutive facial images after photographing the person's face 140, wherein each facial image includes an eye region. In one embodiment, the resolution of the photography device 110 is 1280×720 pixels, and the actual pixel size of the photography device 110 is 4.2 micrometers (μm)×4.2 μm. In another embodiment, the size of the person's face in the facial image generated by the photography device 110 cannot be smaller than 110×110 pixels.

The TCU 120 can receive multiple consecutive facial images produced by the photography device 110 photographing the person's face 140 through a hardware connection interface. When the TCU 120 finds that the person 140 is not in a normal status, the TCU 120 may send a warning message to notify the person 140.

The mobile device 130 may be used by the person 140 driving the vehicle 150. The mobile device 130 may support various wireless access technologies, and the mobile device 130 may be an electronic device, such as a mobile phone, a notebook computer, a smart phone, or a tablet computer. The mobile device 130 may at least comprise a communication device and a processor (not shown in the FIG. 1) for performing wireless transmission with the photography device 110. The mobile device 130 may perform wired communication and/or wireless communication for voice and/or data services through the network, wherein the wireless communication between the mobile device 130 and the photography device 110 may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution Advanced (LTE-A) technology, Global Navigation Satellite System (GNSS) technology, Vehicle to Everything (V2X) technology and others. The mobile device 130 may receive multiple consecutive facial images generated by the photography device 110 photographing the person's face 140 through wireless communication. When the mobile device 130 determines that the person 140 is not in a normal status, the mobile device 130 may send a warning message to notify the person 140.

It should be understood that the TCU 120 and the mobile device 130 shown in FIG. 1 are examples of the architecture of the system 100 for detecting changes in eye status. Each of the devices shown in FIG. 1 may be implemented through any type of electronic device, such as the computing device 1200 described with reference to FIG. 12, for example.

Figure 2:
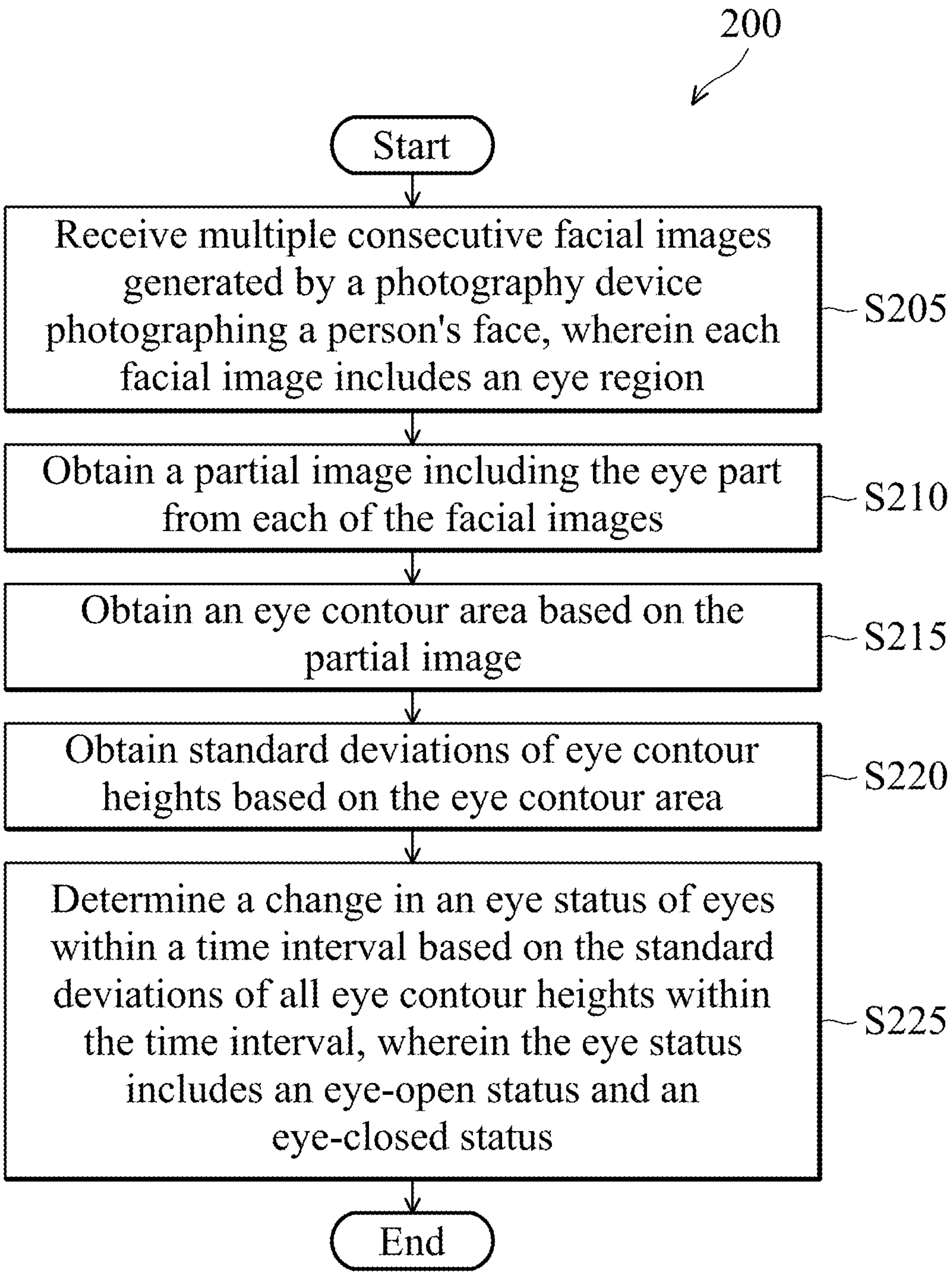
FIG. 2 is a flowchart showing a method for detecting changes in eye status according to an embodiment of the present disclosure.

FIG. 2 is a flowchart showing a method 200 for detecting changes in eye status according to an embodiment of the present disclosure. This method may be executed by a computing device, and the computing device may be implemented by the TCU 120 or the mobile device 130 installed in the vehicle 150 of the system 100 for detecting changes in eye status shown in FIG. 1.

In step S205, the computing device receives multiple consecutive facial images generated by a photography device photographing a person's face, wherein each facial image includes an eye region. In one embodiment, the eye region includes a right eye part or/and a left eye part.

In step S210, the computing device obtains a partial image including the eye part from each of the facial images. Specifically, the computing device may perform face detection on each facial image and output a face region of interest (ROI). When the computing device determines that the face is present in the image, the computing device may perform stationary state detection to determine whether the face is in a stationary state. When the computing device determines that the face is in a stationary state, the computing device first performs facial features analysis on the face ROI, and outputs a set of coordinate points for the location of facial features. Next, the computing device obtains a partial image including the eye region based on the coordinate points of both eyes.

In step S215, the computing device obtains an eye contour area based on the partial image.

In step S220, the computing device obtains standard deviations of eye contour heights based on the eye contour area, wherein the standard deviations of eye contour heights include the standard deviations of right-eye contour heights or/and the standard deviations of left-eye contour heights.

In step S225, the computing device determines a change in an eye status of eyes within a time interval based on the standard deviations of all eye contour heights within the time interval, wherein the eye status includes an eye-open status and an eye-closed status. In one embodiment, "a time interval" is typically measured in seconds and is related to a frame rate. In this example, it is assumed that a time interval is set to 1 second and the frame rate is 30 frames per second (30 FPS). The computing device determines changes in eye status based on 30 consecutive facial images.

The detailed processes in steps S215, S220, and S225 are described in detail below.

Figure 3:
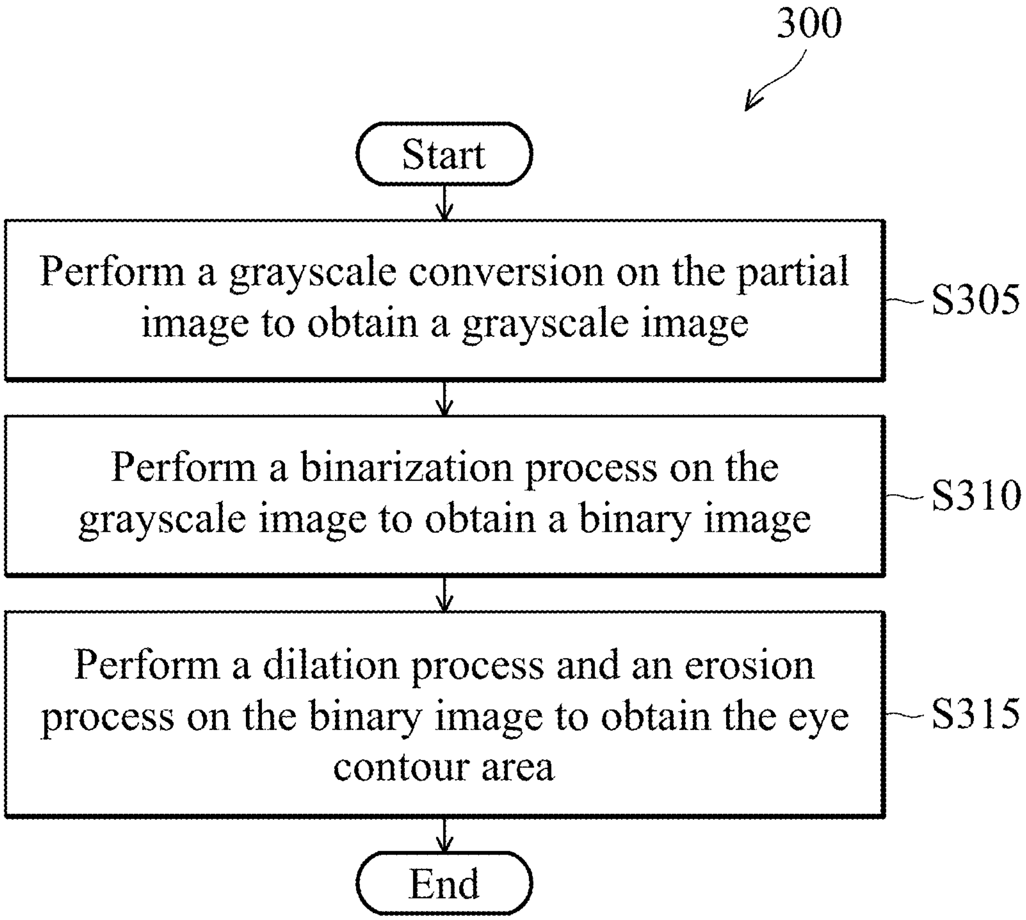
FIG. 3 is a flowchart showing a method for obtaining an eye contour area according to an embodiment of the present disclosure.

FIG. 3 is a flowchart showing a method 300 for obtaining an eye contour area according to an embodiment of the present disclosure. This method 300 is the detailed process of step S215 in FIG. 2, and can be executed by a computing device, wherein the computing device is implemented by the TCU 120 installed in the vehicle 150 or the mobile device 130 in the system 100 for detecting changes in eye status shown in FIG. 1.

After the computing device obtains the partial image of the eye region, in step S305, the computing device performs a grayscale conversion on the partial image to obtain a grayscale image.

In step S310, the computing device performs a binarization process on the grayscale image to obtain a binary image. In one embodiment, the computing device may use an adaptive thresholding method to perform the binarization process on the grayscale image. The adaptive thresholding method uses the adaptiveThreshold( ) function in OpenCV to achieve adaptive thresholding of grayscale images. The adaptive thresholding is a step of image processing and commonly used for edge detection and image segmentation. The binary image after the binarization process has only two colors: black and white, to highlight the boundaries or edge features in the binary image.

Figure 4:
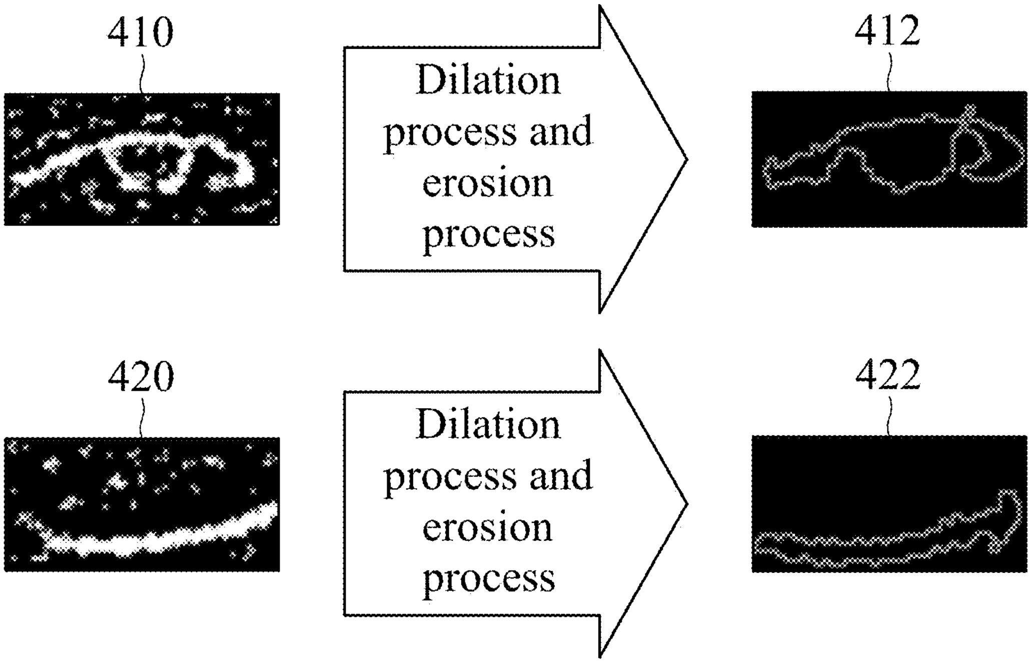
FIG. 4 is a schematic diagram showing the binary image after the dilation process and the erosion process according to an embodiment of the present disclosure.

In step S315, the computing device performs a dilation process and an erosion process on the binary image to obtain the eye contour area. Specifically, the computing device first expands the binary image to enhance the white area in the binary image. Then, the computing device performs the erosion process on the binary image to reduce the white areas and highlight the contour of the eyes in the binary image. As shown in FIG. 4, the image 410 is a binary image with an opened eye, and the image 420 is a binary image with a closed eye. The images 412 and 422 are respectively the contour of an opened eye and the contour of a closed eye after the dilation process and the erosion process.

In another embodiment, before performing the binarization process in step S310, the computing device may use a Gaussian blur algorithm to eliminate noise in the grayscale image and blur the grayscale image to enhance main features in the grayscale image.

In yet another embodiment, before performing the dilation process and erosion process in step S315, the computing device may adjust the size of the binary image. Specifically, the computing device adjusts the width of the binary image to a specified pixel size (for example: 200 pixels), and correspondingly adjusts the height of the binary image to maintain the original proportion of the binary image.

Figure 5:
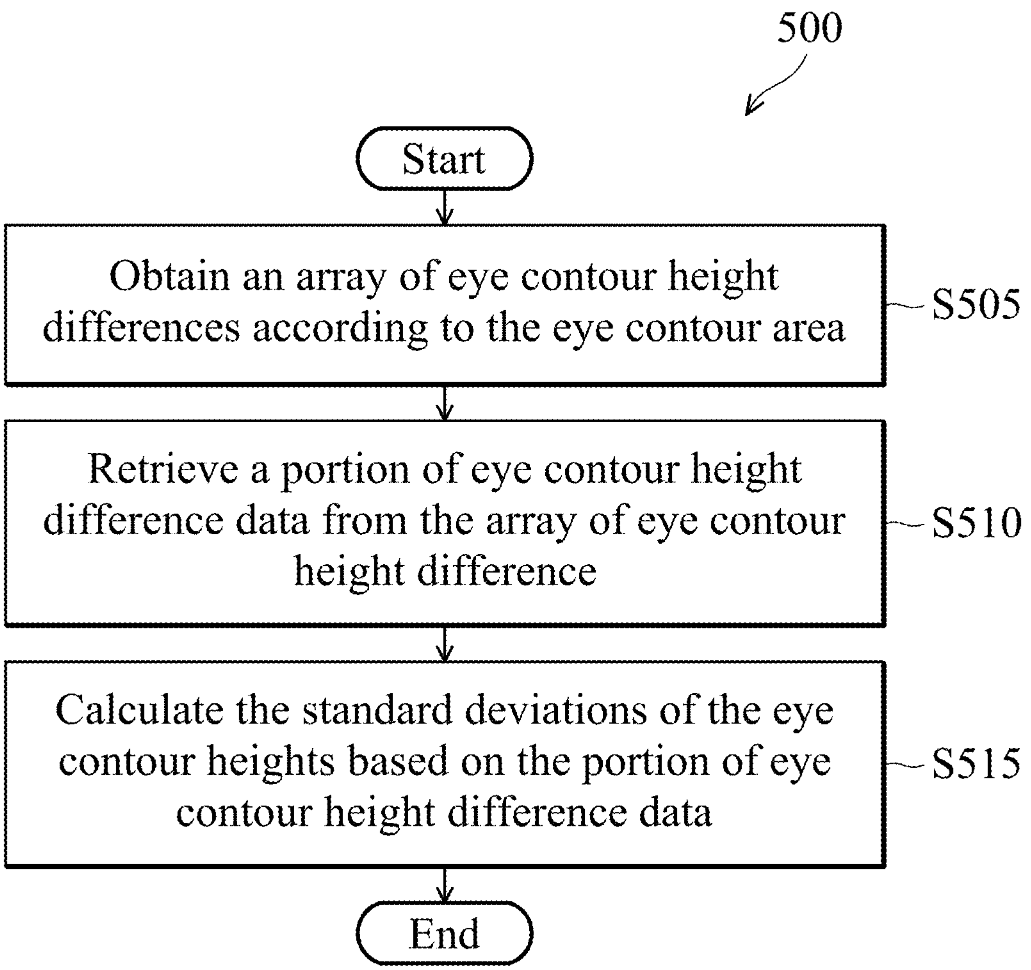
FIG. 5 is a flowchart showing a method for obtaining the standard deviations of eye contour heights according to an embodiment of the present disclosure.

FIG. 5 is a flowchart showing a method 500 for obtaining the standard deviations of eye contour heights according to an embodiment of the present disclosure. This method 500 is the detailed process of step S220 in FIG. 2 and can be executed by a computing device, wherein the computing device is implemented by the TCU 120 installed in the vehicle 150 or the mobile device 130 in the system 100 for detecting changes in eye status shown in FIG. 1.

After the computing device obtains the eye contour area, in step S505, the computing device obtains an array of eye contour height differences according to the eye contour area.

Figure 6:
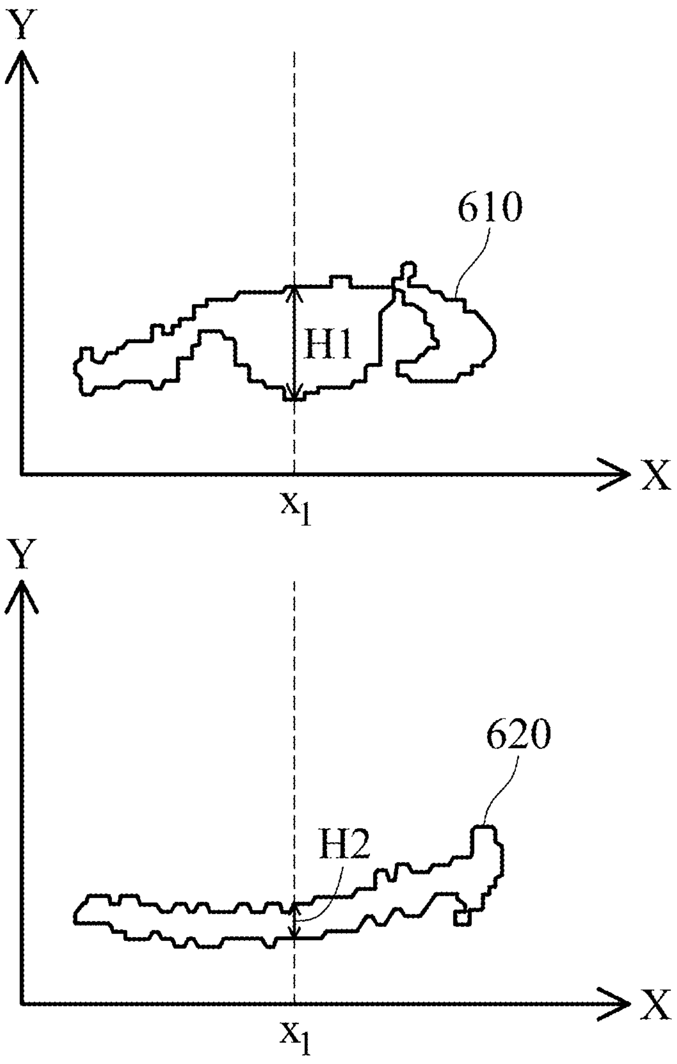
FIG. 6 is a schematic diagram showing the height difference of eye contour according to an embodiment of the present disclosure.

Specifically, the computing device determines the X-axis position of each pixel of the eye contour in the eye contour area and updates the corresponding Y-axis boundary. In other words, based on the X-axis coordinate value of each pixel of the eye contour, only the maximum Y-axis coordinate value and the minimum Y-axis coordinate value corresponding to the eye contour are found. The computing device calculates the height difference of the eye contour in the Y-axis coordinate corresponding to each X-axis coordinate value based on the Y-axis boundary. For example, as shown in FIG. 6, at the pixel where the X-axis coordinate is equal to $x_1$, the height difference of the eye contour 610 of the opened eye is H1, and the height difference of the eye contour 620 of the closed eye is H2. Then, the height differences of all eye contours are sorted from small to large to obtain an array of eye contour height difference.

In step S510, the computing device retrieves a portion of eye contour height difference data from the array of eye contour height difference, wherein the portion of the eye contour height difference data is composed of the first N % of the array of eye contour height differences and the last N % of the array of eye contour height differences. In one embodiment, N can be adjusted according to actual applications, for example: N=20.

In step S515, the computing device calculates the standard deviations of the eye contour heights based on the portion of eye contour height difference data.

Figure 7:
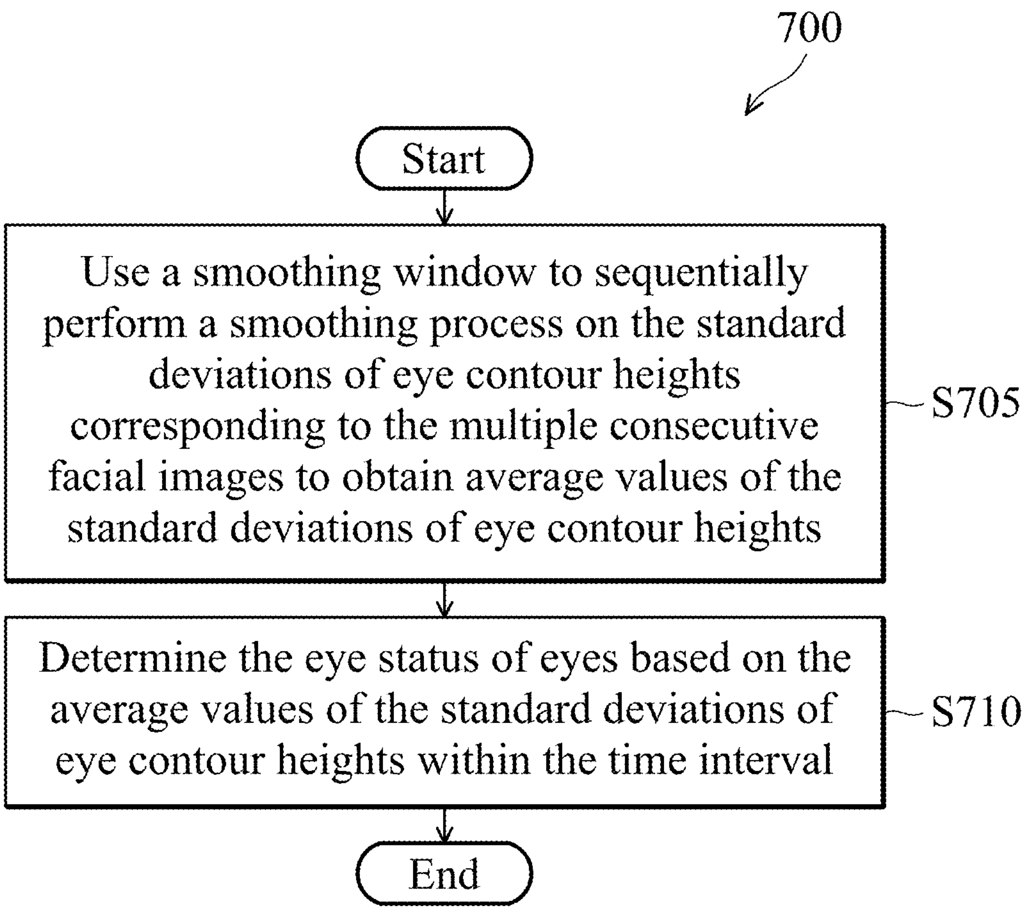
FIG. 7 is a flowchart showing a method for obtaining eye status according to an embodiment of the present disclosure.

FIG. 7 is a flowchart showing a method 700 for obtaining eye status according to an embodiment of the present disclosure. This method 700 is the detailed process of step S225 in FIG. 2 and can be executed by a computing device, wherein the computing device is implemented by the TCU 120 installed in the vehicle 150 or the mobile device 130 in the system 100 for detecting changes in eye status shown in FIG. 1.

After the computing device obtains the standard deviations of the eye contour heights, in step S705, the computing device uses a smoothing window to sequentially perform a smoothing process on the standard deviations of eye contour heights corresponding to the multiple consecutive facial images to obtain average values of the standard deviations of eye contour heights.

Specifically, the computing device arranges the standard deviations of eye contour heights corresponding to multiple consecutive facial images in the order in which the facial images are obtained. Then, the computing device uses a smoothing window to sequentially calculate the average values of the standard deviations of the eye contour heights within the smoothing window. In one embodiment, the length of the smoothing window is related to the frame rate (the unit is FPS) as a multiple S, wherein the multiple S affects the smoothness of the standard deviations of the eye contour heights within a period of time. In yet another embodiment, the multiple S is 2, and the length of the smoothing window is FPS×2.

In step S710, the computing device determines the eye status of eyes based on the average values of the standard deviations of eye contour heights within the time interval. In one embodiment, when the average values of the standard deviations of eye contour heights in the time interval continues to increase and a current average value of a standard deviation of a current eye contour height at the current time point is greater than an eye-open threshold, the computing device determines that the change in the eye status of eyes within the time interval is from the eye-closed status to the eye-open status. When the average values of the standard deviations of eye contour heights in the time interval continues to decrease and the current average value of the standard deviation of the current eye contour height at the current time point is less than an threshold, the computing device determines that the change in the eye status of eyes within the time interval is from the eye-open status to the eye-closed status.

In one embodiment, the eye-open threshold and the eye-closed threshold are dynamic thresholds. Specifically, when the computing device determines that the received facial image is in a stationary state, the computing device collects the average values of the standard deviations of eye contour heights in a preset time interval (for example, 60 seconds), and sorts the average values of the standard deviations of eye contour heights from large to small to obtain an array of the average values of the standard deviations of eye contour heights. The computing device retrieves a portion of average values of the standard deviations of eye contour heights data from the array of the average values of the standard deviations of eye contour heights. In another embodiment, the portion of average values of the standard deviations of eye contour heights data is composed of the first 20% of the array of the average values of the standard deviations of eye contour heights. The computing device averages the portion of average values of the standard deviations of eye contour heights data to obtain a dynamic average. The computing device sets the dynamic average multiplied by a first coefficient as the eye-open threshold, and sets the dynamic average multiplied by a second coefficient as the eye-closed threshold, wherein the sum of the first coefficient and the second coefficient is 1, and the first coefficient is greater than the second coefficient. In another embodiment, the first coefficient is 75% and the second coefficient is 25%, but it should not be so limited in the disclosure.

In yet another embodiment, the eye-open threshold and the eye-closed threshold are static thresholds. Specifically, when the computing device determines that the received facial image is not in a stationary state, the computing device uses a preset value to calculate the eye-open threshold and the eye-closed threshold. For example, the computing device sets the preset value multiplied by a first coefficient as the eye-open threshold, and sets the preset value multiplied by a second coefficient as the eye-closed threshold, wherein the sum of the first coefficient and the second coefficient is 1 and the first coefficient is greater than the second coefficient. In another embodiment, the first coefficient is 75% and the second coefficient is 25%, but it should not be so limited in the disclosure.

The following FIGS. 8 to 11 use real data to illustrate how to detect changes in eye status in the present disclosure.

Figure 8:
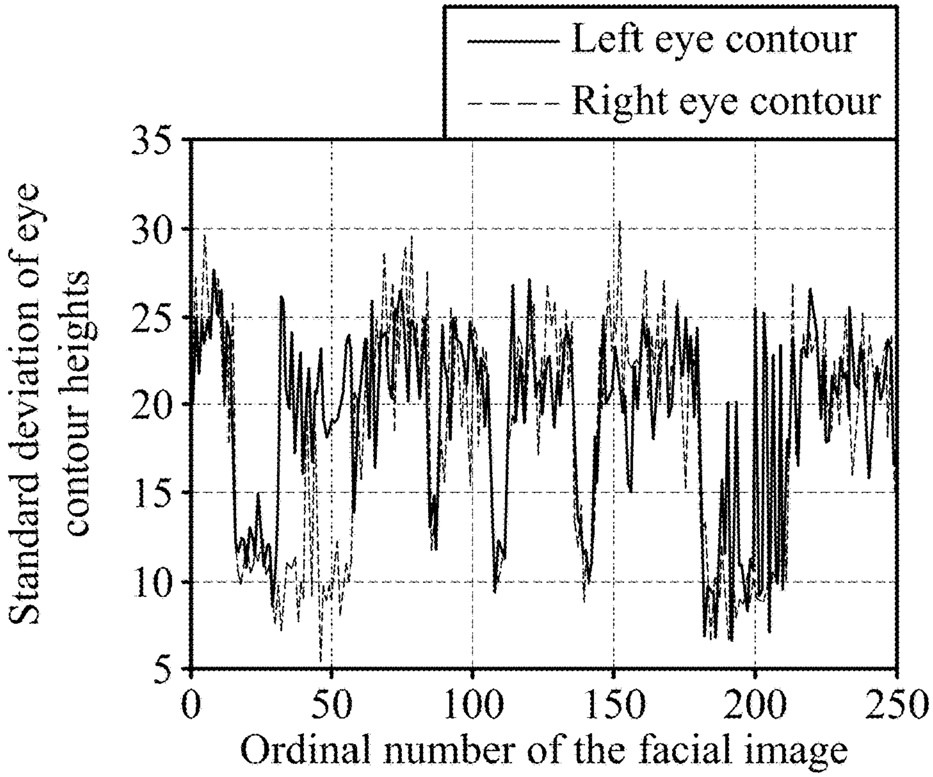
FIG. 8 is a schematic diagram showing the standard deviations of eye contour heights corresponding to multiple consecutive facial images according to an embodiment of the present disclosure.

FIG. 8 is a schematic diagram showing the standard deviations of eye contour heights corresponding to multiple consecutive facial images according to an embodiment of the present disclosure. As shown in FIG. 8, the horizontal axis represents the ordinal number of the facial image, and the vertical axis represents the standard deviation of the eye contour height corresponding to each facial image. In image processing, since the eye contour may be affected by the physiological response or movement of the face, light and shadow interference, and sampling frequency in consecutive facial images, the standard deviation of the eye contour height is change drastically. Therefore, the standard deviation of the eye contour height needs to be further smoothed to improve the situation of severe jitter in the standard deviation of the eye contour height in the image.

Figure 9:
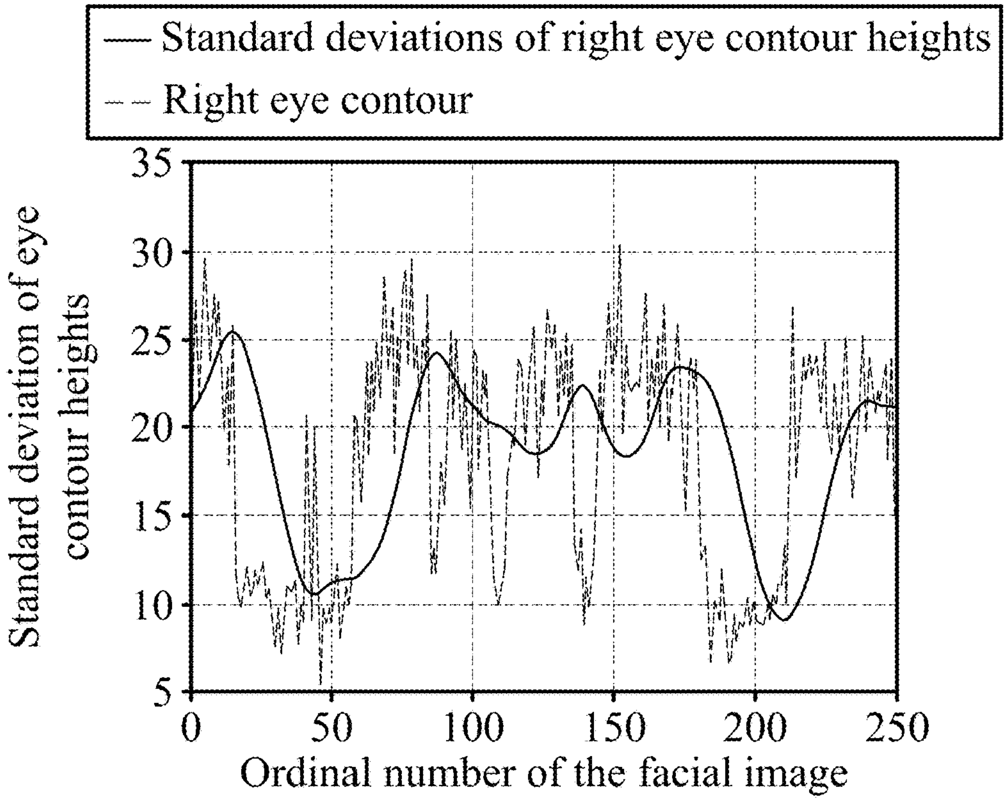
FIG. 9 is a schematic diagram showing the standard deviations of the right eye contour heights and the average values of the standard deviations of the right eye contour heights according to an embodiment of the present disclosure.

FIG. 9 is a schematic diagram showing the standard deviations of the right eye contour heights and the average values of the standard deviations of the right eye contour heights according to an embodiment of the present disclosure. As shown in FIG. 9, the dotted line in FIG. 9 is the original standard deviations of the right eye contour heights, and the solid line is the average value of the standard deviations of the right eye contour heights after the smoothing process. The average value of the standard deviations of the right eye contour heights after the smoothing process significantly improves the severe jitter of the original standard deviations of the right eye contour heights.

Figure 10:
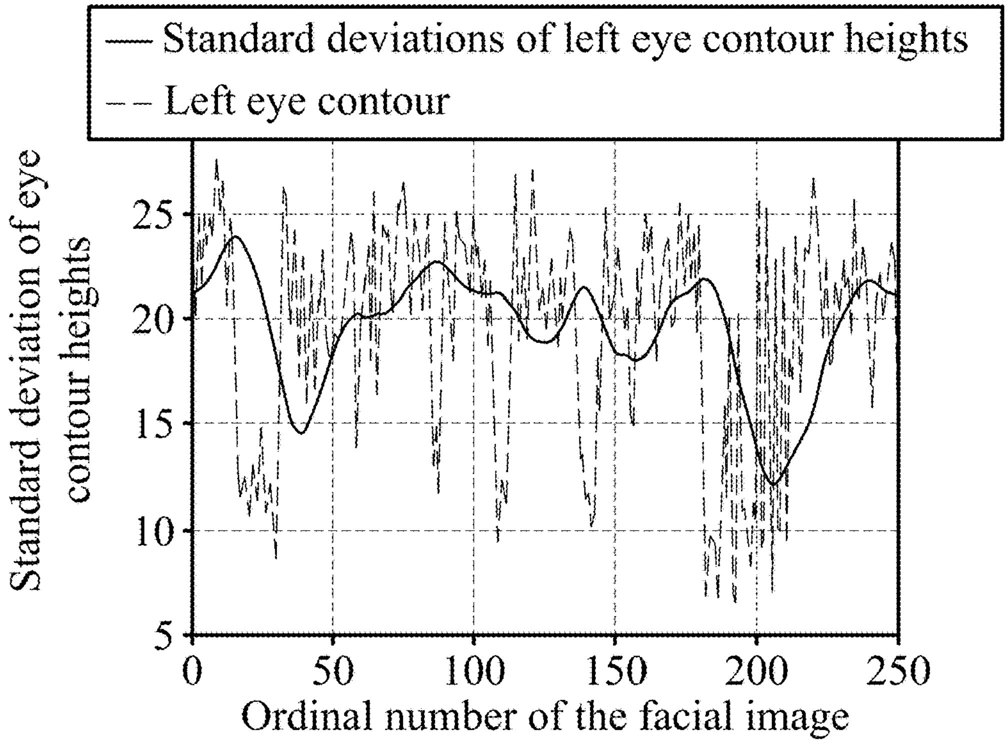
FIG. 10 is a schematic diagram showing the standard deviations of the left eye contour heights and the average values of the standard deviations of the left eye contour heights according to an embodiment of the present disclosure.

FIG. 10 is a schematic diagram showing the standard deviations of the left eye contour heights and the average values of the standard deviations of the left eye contour heights according to an embodiment of the present disclosure. As shown in the FIG. 10, the dotted line in FIG. 10 is the original standard deviations of the left eye contour heights, and the solid line is the average value of the standard deviations of the left eye contour heights after the smoothing process. Similar to FIG. 9, the average value of the standard deviations of the left eye contour heights after the smoothing process significantly improves the severe jitter of the original standard deviations of the left eye contour heights.

Figure 11:
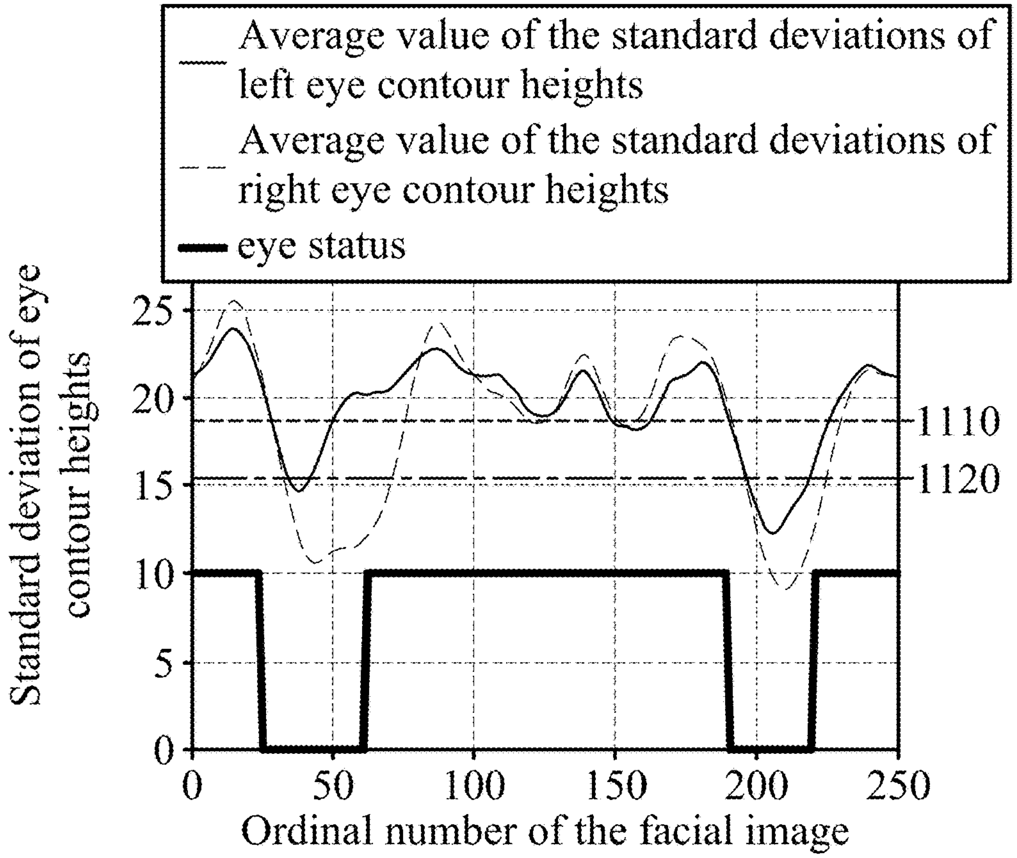
FIG. 11 is a schematic diagram showing changes in eye status according to an embodiment of the present disclosure.

FIG. 11 is a schematic diagram showing changes in eye status according to an embodiment of the present disclosure. As shown in FIG. 11, the line 1110 is an eye-open threshold and the line 1120 is an eye-closed threshold, which are used to detect changes in the eye status from an eye-open status to an eye-closed status or from an eye-closed status to an eye-open status. That is to say, when the line representing the average values of the standard deviations of left eye contour heights and the line representing the average values of the standard deviations of right eye contour heights continue to fall downward and are lower than the eye opening threshold 1110, it is defined as an eye-closed action. Conversely, when the line representing the average values of the standard deviations of left eye contour heights and the line representing the average values of the standard deviations of right eye contour heights continue to rise and are higher than the eye closing threshold 1120, it is defined as an eye-open action. In FIG. 11, the lower thick line is the result of detecting changes in the eye status. The value of this line is equal to 10, which means the status is the eye-open status, and the value of this line is equal to 0, which means the status is the eye-closed status.

The following examples illustrate the application of changes in eye status and driving fatigue detection. It should be noted that the definition of the status and the setting of the time in this example are not used to limit the present disclosure, and those skilled in the art can make appropriate replacements or adjustments according to this embodiment.

The following is to first define the states used in fatigue detection.

Fatigued state: the proportion of time a person closes his eyes within one minute is greater than 20%. This status can be called the "fatigue onset state", emphasizing that the person is beginning to experience fatigue symptoms, but still retains a certain degree of responsiveness and concentration.

Drowsy state: The person closes his eyes continuously for more than 1 second, but less than 3 seconds. This state can be called "drowsy alert state" to highlight the danger of this state and the need for alertness.

Sleeping state: The person continuously closes his eyes for more than 3 seconds but less than 6 seconds. This state can be called the "Semi-Sleep State", depicting a person entering a state of sleep but still having the ability to be partially aware.

Coma state: The person closes his eyes continuously for more than 6 seconds. This state can be called the "unconscious state", which emphasizes that the person completely loses the ability to respond and control the outside world. This state is also the most dangerous state.

Normal state: other states except the above four states "fatigued state", "drowsy state", "sleeping state" and "coma state".

Taking FIG. 11 as an example, the computing device may detect the continuous high and low state of the thick line at the bottom of FIG. 11 and time statistics to determine whether the person is tired. For example: it is assumed that the current FPS is equal to 30. The computing device needs to determine whether, among the 1800 (30×60) facial images within one minute, there are more than 360 (20% of 1800) facial images corresponding to the thick line with a value of 0 at the bottom of FIG. 11. When there are more than 360 images, the computing device determines that the person is in a "fatigued state". As for the "drowsy state", the computing device needs to determine whether the number of facial images corresponding to the thick line with a value of 10 at the bottom of FIG. 11 below exceeds 30 consecutive images, and so on for the detection methods of other states.

It should be noted that although the average values of the standard deviations of left eye contour heights and the average values of the standard deviations of right eye contour heights are used to determine the changes in the eye status in the present disclosure, those skilled in the art can make appropriate replacements or adjustments according to this embodiment. For example, the computing device may also only use the average values of the standard deviations of left eye contour heights or the average values of the standard deviations of right eye contour heights to determine changes in the eye status, so as to reduce the calculation load of the computing device.

In one embodiment, when the eyes are in an eye-closed status for more than a preset time interval, the computing device can send a warning message to notify the person, wherein the computing device can use related user interfaces (For example, light-emitting diodes (LED), liquid crystal displays (LCD), microphones, Buzzers, Bluetooth streaming) to remind the person or trigger a vibration in the vehicle's steering wheel to wake up the person.

As mentioned above, the method and device for detecting changes in eye status provided in the present disclosure can significantly increase the difference in eye contours between the "eye-closed status" and the "eye-open status" in the facial image, so as to achieve the purpose of accurately detecting changes in eye status.

Figure 12:
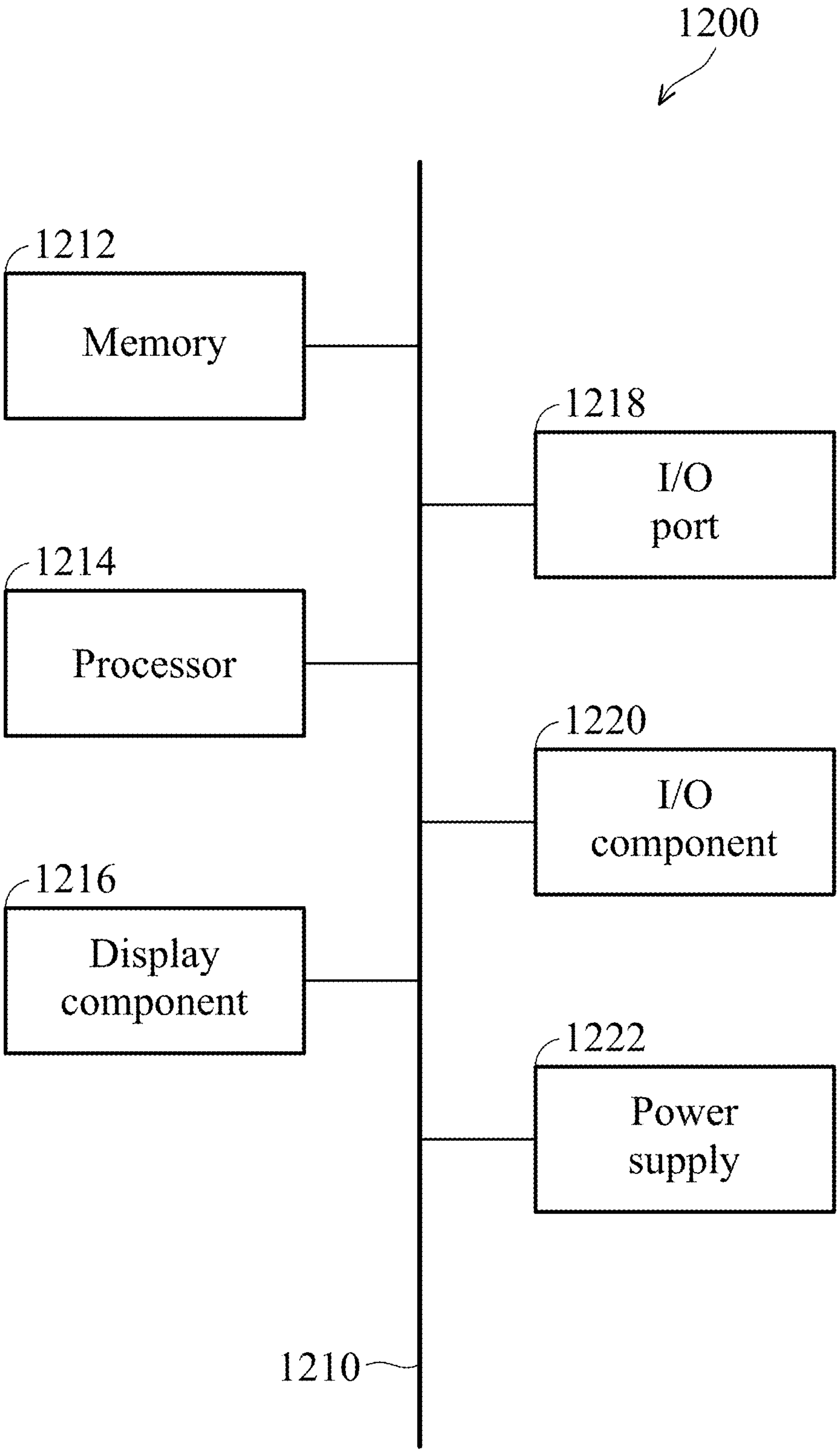
FIG. 12 illustrates an exemplary operating environment for implementing embodiments of the present disclosure.

Having described embodiments of the present disclosure, an exemplary operating environment in which embodiments of the present disclosure may be implemented is described below. Referring to FIG. 12, an exemplary operating environment for implementing embodiments of the present disclosure is shown and generally known as a computing device 1200. The computing device 1200 is merely an example of a suitable computing environment and is not intended to limit the scope of use or functionality of the disclosure. Neither should the computing device 1200 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 12, the computing device 1200 may include a bus 1210 that is directly or indirectly coupled to the following devices: one or more memories 1212, one or more processors 1214, one or more display components 1216, one or more input/output (I/O) ports 1218, one or more input/output components 1220, and an illustrative power supply 1222. The bus 1210 may represent one or more kinds of busses (such as an address bus, data bus, or any combination thereof). Although the various blocks of FIG. 12 are shown with lines for the sake of clarity, and in reality, the boundaries of the various components are not specific. For example, the display component such as a display device may be considered an I/O component and the processor may include a memory.

The computing device 1200 typically includes a variety of computer-readable media. The computer-readable media can be any available media that can be accessed by computing device 1200 and includes both volatile and nonvolatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 1200. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 1212 may include computer-storage media in the form of volatile and/or nonvolatile memory. The memory may be removable, non-removable, or a combination thereof. Exemplary hardware devices include solid-state memory, hard drives, optical-disc drives, etc. The computing device 1200 includes one or more processors that read data from various entities such as the memory 1212 or the I/O components 1220. The display component(s) 1216 present data indications to a user or to another device. Exemplary presentation components include a display device, speaker, printing component, vibrating component, etc.

The I/O ports 1218 allow the electronic device 1200 to be logically coupled to other devices including the I/O components 1220, some of which may be embedded. Illustrative components include a microphone, joystick, game pad, satellite dish, scanner, printer, wireless device, etc. The I/O components 1220 may provide a natural user interface (NUI) that processes gestures, voice, or other physiological inputs generated by a user. For example, inputs may be transmitted to an appropriate network element for further processing. The computing device 1200 may be equipped with depth cameras, such as stereoscopic camera systems, infrared camera systems, RGB camera systems, or any combination thereof, to detect and identify objects. In addition, the computing device 1200 may be equipped with sensors (e.g., radar, lidar) to periodically sense the surrounding environment within a sensing range and generate sensor information representing the relationship between the computing device 1200 and the surrounding environment. Furthermore, the computing device 1200 may be equipped with accelerometers or gyroscopes that enable detection of motion. The output of the accelerometers or gyroscopes may be provided to the computing device 1200 for display.

Furthermore, the processor 1214 in the computing device 1200 can execute the program code in the memory 1212 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting changes in eye status, comprising:

receiving multiple consecutive facial images generated by a photography device photographing a person’s face, wherein each facial image includes an eye region;

obtaining a partial image including the eye region from each of the facial images;

obtaining an eye contour area based on the partial image;

obtaining standard deviations of eye contour heights based on the eye contour area;

using a smoothing window to sequentially perform a smoothing process on the standard deviations of eye contour heights corresponding to the multiple consecutive facial images to obtain average values of the standard deviations of eye contour heights; and determining a change in the eye status of eyes within a time interval based on the standard deviations of all eye contour heights within the time interval, wherein the determining the change in the eye status of eyes within the time interval further comprises:

determining that the change in the eye status of eyes within the time interval is from the eye-closed status to an eye-open status when the average values of the standard deviations of eye contour heights in the time interval continue to increase; and determining that the change in the eye status of eyes within the time interval is from the eye-open status to an eye-closed status when the average values of the standard deviations of eye contour heights in the time interval continue to decrease.

2. The method for detecting changes in eye status as claimed in claim 1, wherein the step of obtaining an eye contour area based on the partial image further comprises:

performing a grayscale conversion on the partial image to obtain a grayscale image;

performing a binarization process on the grayscale image to obtain a binary image; and performing a dilation process and an erosion process on the binary image to obtain the eye contour area.

3. The method for detecting changes in eye status as claimed in claim 1, wherein the step of obtaining standard deviations of eye contour heights based on the eye contour area further comprises:

obtaining an array of eye contour height differences according to the eye contour area;

retrieving a portion of eye contour height difference data from the array of eye contour height difference; and calculating the standard deviations of the eye contour heights based on the portion of eye contour height difference data.

4. The method for detecting changes in eye status as claimed in claim 3, wherein the portion of the eye contour height difference data is composed of the first N % of the array of eye contour height differences and the last N % of the array of eye contour height differences.

5. The method for detecting changes in eye status as claimed in claim 1, wherein:

the step of determining that the change in the eye status of eyes within the time interval is from the eye-closed status to the eye-open status further requires that a current average value of a standard deviation of a current eye contour height at a current time point is greater than an eye-open threshold; and the step of determining that the change in the eye status of eyes within the time interval is from the eye-open status to the eye-closed status further requires that the current average value of the standard deviation of the current eye contour height at the current time point is less than an eye-closed threshold.

6. The method for detecting changes in eye status as claimed in claim 5, wherein the eye-open threshold and the eye-closed threshold are obtained according to the following steps:

obtaining an array of the average values of the standard deviations of eye contour heights according to a preset time interval;

retrieving a portion of average values of the standard deviations of eye contour heights data from the array of the average values of the standard deviations of eye contour heights;

averaging the portion of the average values of the standard deviations of eye contour heights data to obtain a dynamic average; and setting the dynamic average multiplied by a first coefficient as the eye-open threshold, and setting the dynamic average multiplied by a second coefficient as the eye-closed threshold.

7. The method for detecting changes in eye status as claimed in claim 6, wherein a sum of the first coefficient and the second coefficient is 1 and the first coefficient is greater than the second coefficient.

8. The method for detecting changes in eye status as claimed in claim 1, wherein the standard deviations of the eye contour heights comprise a standard deviation of a right eye contour height or/and a standard deviation of a left eye contour height.

9. The method for detecting changes in eye status as claimed in claim 1, wherein when the eyes are in the eye-closed status for more than a preset time interval, a warning message is sent to notify the person.

10. A device for detecting changes in eye status, comprising:

one or more processors; and one or more computer storage media for storing one or more computer-readable instructions, wherein the processor is configured to drive the computer storage media to execute the following tasks:

receiving multiple consecutive facial images generated by a photography device photographing a person’s face, wherein each facial image includes an eye region;

obtaining a partial image including the eye region from each of the facial images;

obtaining an eye contour area based on the partial image;

obtaining standard deviations of eye contour heights based on the eye contour area;

using a smoothing window to sequentially perform a smoothing process on the standard deviations of eye contour heights corresponding to the multiple consecutive facial images to obtain average values of the standard deviations of eye contour heights; and determining a change in the eye status of eyes within a time interval based on the standard deviations of all eye contour heights within the time interval, wherein, in determining the change in the eye status of eyes within the time interval, the processor further executes the following tasks:

determining that the change in the eye status of eyes within the time interval is from the eye-closed status to an eye-open status when the average values of the standard deviations of eye contour heights in the time interval continue to increase; and determining that the change in the eye status of eyes within the time interval is from the eye-open status to an eye-closed status when the average values of the standard deviations of eye contour heights in the time interval continue to decrease.

11. The device for detecting changes in eye status as claimed in claim 10, wherein the step of obtaining an eye contour area based on the partial image executed by the processor further comprises:

performing a grayscale conversion on the partial image to obtain a grayscale image;

performing a binarization process on the grayscale image to obtain a binary image; and performing a dilation process and an erosion process on the binary image to obtain the eye contour area.

12. The device for detecting changes in eye status as claimed in claim 10, wherein the step of obtaining standard deviations of eye contour heights based on the eye contour area executed by the processor further comprises:

obtaining an array of eye contour height differences according to the eye contour area;

retrieving a portion of eye contour height difference data from the array of eye contour height difference; and calculating the standard deviations of the eye contour heights based on the portion of eye contour height difference data.

13. The device for detecting changes in eye status as claimed in claim 12, wherein the portion of the eye contour height difference data is composed of the first N % of the array of eye contour height differences and the last N % of the array of eye contour height differences.

14. The device for detecting changes in eye status as claimed in claim 10, wherein the tasks executed by the processor further comprise;

the step of determining that the change in the eye status of eyes within the time interval is from the eye-closed status to the eye-open status further requires that a current average value of a standard deviation of a current eye contour height at a current time point is greater than an eye-open threshold; and the step of determining that the change in the eye status of eyes within the time interval is from the eye-open status to the eye-closed status further requires that the current average value of the standard deviation of the current eye contour height at the current time point is less than an eye-closed threshold.

15. The device for detecting changes in eye status as claimed in claim 14, wherein the eye-open threshold and the eye-closed threshold are obtained according to the following steps executed by the processor:

obtaining an array of the average values of the standard deviations of eye contour heights according to a preset time interval;

retrieving a portion of average values of the standard deviations of eye contour heights data from the array of the average values of the standard deviations of eye contour heights;

averaging the portion of the average values of the standard deviations of eye contour heights data to obtain a dynamic average; and setting the dynamic average multiplied by a first coefficient as the eye-open threshold, and setting the dynamic average multiplied by a second coefficient as the eye-closed threshold.

16. The device for detecting changes in eye status as claimed in claim 15, wherein a sum of the first coefficient and the second coefficient is 1 and the first coefficient is greater than the second coefficient.

17. The device for detecting changes in eye status as claimed in claim 10, wherein the standard deviations of the eye contour heights comprise a standard deviation of a right eye contour height or/and a standard deviation of a left eye contour height.

18. The device for detecting changes in eye status as claimed in claim 10, wherein when the eyes are in the eye-closed status for more than a preset time interval, a warning message is sent to notify the person.

* * * * *